United States Patent
Dede et al.

(10) Patent No.: US 10,176,316 B2
(45) Date of Patent: Jan. 8, 2019

(54) SYSTEMS AND METHODS FOR PROVIDING AND DETECTING THERMAL ENERGY PATTERNS IN ELECTRONIC DEVICES

(71) Applicant: Toyota Motor Engineering & Manufacturing North America, Inc., Erlanger, KY (US)

(72) Inventors: Ercan M. Dede, Ann Arbor, MI (US); Paul Schmalenberg, Ann Arbor, MI (US)

(73) Assignee: TOYOTA MOTOR ENGINEERING & MANUFACTURING NORTH AMERICA, INC., Erlanger, KY (US)

(*) Notice: Subject to any disclaimer, the term of this patent is extended or adjusted under 35 U.S.C. 154(b) by 333 days.

(21) Appl. No.: 15/067,909

(22) Filed: Mar. 11, 2016

(65) Prior Publication Data

US 2017/0262660 A1    Sep. 14, 2017

(51) Int. Cl.
 *H02J 7/00*   (2006.01)
 *G06F 21/44*  (2013.01)
 *G06F 21/73*  (2013.01)
 *G09C 1/00*   (2006.01)

(52) U.S. Cl.
 CPC ............. *G06F 21/44* (2013.01); *G06F 21/73* (2013.01); *G09C 1/00* (2013.01); *G06F 2221/2103* (2013.01)

(58) Field of Classification Search
 CPC ............ G01R 31/2856; G01R 31/2875; G01K 13/00; G01K 3/06; G06F 21/44; G06F 21/73; G06F 21/85; G06F 2221/2103; G09C 1/00
 See application file for complete search history.

(56) References Cited

U.S. PATENT DOCUMENTS

| | | | |
|---|---|---|---|
| 6,034,874 A * | 3/2000 | Watanabe | ........... H01L 23/4093 165/80.3 |
| 6,203,069 B1 | 3/2001 | Outwater et al. | |
| 8,500,015 B2 | 8/2013 | Grant et al. | |
| 2007/0215685 A1 | 9/2007 | Self et al. | |
| 2012/0049874 A1 * | 3/2012 | LaCroix | ............. G01R 31/2856 324/750.03 |
| 2015/0061278 A1 | 3/2015 | Cruz et al. | |

FOREIGN PATENT DOCUMENTS

| | | |
|---|---|---|
| CN | 101667247 A | 3/2010 |
| CN | 203503241 U | 3/2014 |
| WO | 2015054188 A1 | 4/2015 |

* cited by examiner

*Primary Examiner* — Vuthe Siek
(74) *Attorney, Agent, or Firm* — Dinsmore & Shohl, LLP

(57) ABSTRACT

Systems, apparatuses, and methods for verifying an authenticity of an electronic device are disclosed. An apparatus includes one or more heat generating components coupled to an electronic device and arranged in a particular configuration such that, when selectively activated, the one or more heat generating components emit thermal radiation in a specific heat pattern that corresponds to the particular configuration and the selective activation. The specific heat pattern is readable by a thermal reading device to obtain information regarding the apparatus.

20 Claims, 10 Drawing Sheets

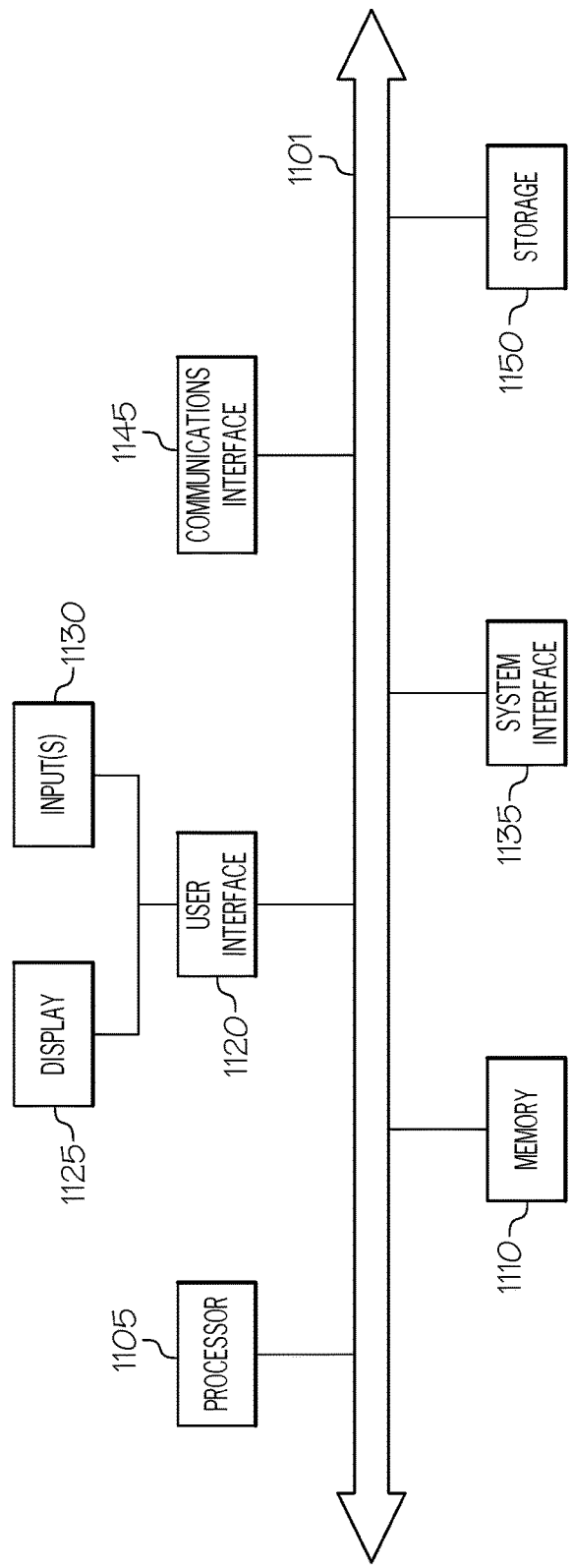
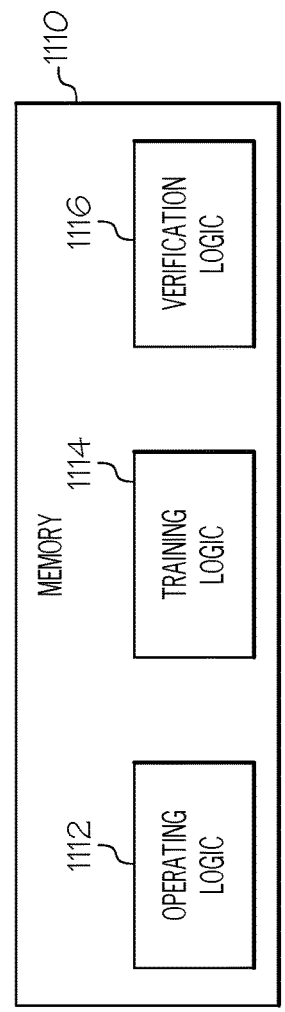
FIG. 11A
FIG. 11B

SYSTEMS AND METHODS FOR PROVIDING AND DETECTING THERMAL ENERGY PATTERNS IN ELECTRONIC DEVICES

TECHNICAL FIELD

The present specification generally relates to using existing or new components in electronic devices to provide a heat signature in the form of a thermal energy pattern and, more specifically, to apparatuses, systems, and methods for particularly arranging and powering heat generating components in an electronic device to generate a specific thermal energy pattern.

BACKGROUND

Counterfeiting has been and continues to be an issue with electronics manufacturers. Electronic devices, particularly electronic devices that are in high demand, are targeted by counterfeiters, who construct similar electronic devices and attempt to pass those similar electronic devices as the real thing. Frequently, such similar electronic devices are copied to an extent that it is difficult to determine whether the similar electronic device is authentic. As such, it may be necessary to mark the authentic electronic device to distinguish it from counterfeit devices.

Previous anti-counterfeiting measures have included imprinting a symbology (such as a QR code or the like) on the electronic device. Such a symbology can be scanned by a reader to determine whether the electronic device is authentic. However, counterfeiters have circumvented this protection measure by copying the symbology and placing it on the counterfeit device. Another anti-counterfeiting measure has included imprinting the symbology with an invisible ink containing one or more compounds that are only readable under certain conditions, such as when heat is applied to the electronic device and/or the electronic device is viewed under a particular wavelength of light. Illustrative compounds include, but are not limited to, a thermoreactive compound, a chemically reactive compound, electromagnetic radiation-sensitive compound, and/or the like. However, such anti-counterfeiting measures are only temporarily effective, as counterfeiters eventually discover the measures and adapt the counterfeit devices accordingly.

Accordingly, a need exists for apparatuses, systems, and methods for protecting and verifying the authenticity of electronic devices that is not easily detectable by counterfeiters, would be expensive to counterfeit, and can be periodically changed to stay a step ahead of counterfeiters.

SUMMARY

In one embodiment, an apparatus includes one or more heat generating components coupled to an electronic device and arranged in a particular configuration such that, when selectively activated, the one or more heat generating components emit thermal radiation in a specific heat pattern that corresponds to the particular configuration and the selective activation. The specific heat pattern is readable by a thermal reading device to obtain information regarding the apparatus.

In another embodiment, a method of obtaining information regarding an electronic device includes activating one or more heat generating components coupled to the electronic device. The one or more heat generating components are arranged in a particular configuration. The method further includes placing a thermal reading device adjacent to the one or more heat generating components. The thermal reading device determines a heat pattern that corresponds to the particular configuration. The method further includes obtaining information from the heat pattern.

In yet another embodiment, a system for verifying an authenticity of an electronic device includes the electronic device, one or more heat generating components coupled to the electronic device and arranged in a particular configuration, the one or more heat generating components configured to activate and emit thermal radiation in a heat pattern that corresponds to the particular configuration when the electronic device is powered on, and a thermal reading device. The heat pattern is readable by the thermal reading device when the thermal reading device is placed adjacent to the activated one or more heat generating components.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 11A schematically depicts a block diagram of illustrative hardware of a computing device that is used to program and verify an authenticity of an electronic device according to one or more embodiments shown and described herein;

FIG. 11B schematically depicts a block diagram of illustrative logic components contained within a memory of a computing device according to one or more embodiments shown and described herein.

DETAILED DESCRIPTION

The embodiments described herein are generally directed to apparatuses, systems, and methods for determining and verifying an authenticity of an electronic device, as well as providing anti-counterfeiting measures. Such apparatuses, systems, and methods generally incorporate one or more heat generating components that are particularly arranged such that, when they are activated, the one or more heat generating components emit thermal energy in a heat pattern, which can be encoded and used to determine the authenticity of the device. The one or more heat generating components are normally functioning components of an electronic device that are particularly arranged in fabricating the electronic device so that they emit the heat pattern. In some embodiments, as described in greater detail herein, only a portion of the one or more heat generating components may be used to generate the heat pattern, and the exact portion that is used may change from time to time. Such apparatuses, systems, and methods function to hide from a counterfeiter such that counterfeit devices cannot be constructed to accurately mimic the one or more heat generating components.

While the embodiments described herein are generally used for the purposes of determining whether an electronic device is authentic or counterfeit based on the positioning of the heat generating components arranged thereon and the heat signature generated by the heat generating components, such components may also be used to verify the functionality of the electronic device, to verify an inventory, to ensure that the electronic device includes all of the necessary components thereof, and/or the like. For example, if one or more heat generating devices are not generating thermal energy as expected, the embodiments described herein may allow for the detection of the malfunctioning devices so that corrective action can be taken, such as repairing or replacing the malfunctioning devices. As such, it should be understood that the present application is not limited to merely determining whether the electronic device is counterfeit.

Figure 1:
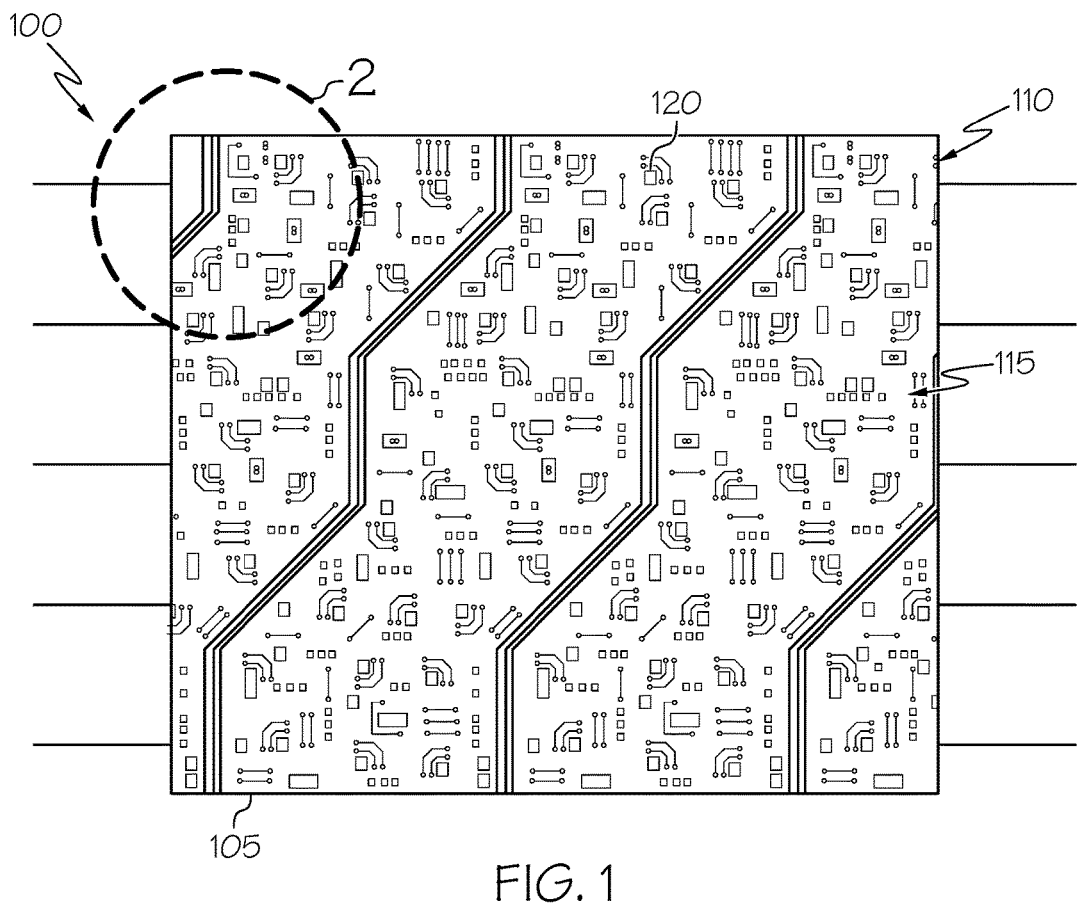
FIG. 1 schematically depicts a top view of an illustrative system having one or more heat generating components coupled thereto according to one or more embodiments shown and described herein.

Referring now to FIG. 1, an illustrative system 100 for verifying an authenticity is depicted. The system 100 may generally include an electronic device 105 and an apparatus 110. In some embodiments, the apparatus 110 may be separate from the electronic device 105. In other embodiments, the electronic device 105 may be a portion of the apparatus 110 (e.g., integrated as a portion of the apparatus 110).

The electronic device 105 is not limited by this disclosure, and may generally be any manufactured electronic device, such as, but not limited to, a semiconductor device, an integrated circuit (IC), one or more electronic circuits, a system on a chip (SoC) or the like. As used herein, a semiconductor device refers to an electronic component that exploits the electronic properties of semiconductor materials, such as, without limitation, silicon, germanium, gallium arsenide (GaAs), silicon carbide (SiC), and organic materials. A semiconductor device as used herein is not limited to a particular type, and may include for example, a chip (i.e., a die) or the like that contains circuit elements contained within a package, and/or the like. In some embodiments, a semiconductor device may include a bipolar junction transistor, such as a metal-oxide-semiconductor field-effect transistor (MOSFET) or an insulated gate bipolar transistor (IGBT). As used herein, an integrated circuit is an electromechanical assembly that is configured to completely enclose an integrated circuit die, and which includes a plurality of electrical conductors that carry signals to and from the die. In a multichip integrated circuit package, several die may be enclosed. As used herein, a system on a chip refers to an IC or the like that integrates one or more computing components (e.g., a processing device, memory, a memory controller, input/output interface, and/or the like) into a single chip. Other electronic devices not specifically disclosed herein (including those now known or later developed) are contemplated and possible.

The apparatus 110 may generally include one or more heat generating components 120 that are coupled to the electronic device 105. In some embodiments, the one or more heat generating components 120 may be integrated with the electronic device 105. In other embodiments, the one or more heat generating components 120 may be disposed on a surface of the electronic device 105, as described in greater detail herein.

The one or more heat generating components 120 are generally components of the electronic device 105 itself that are arranged in a particular manner. That is, the one or more heat generating components 120 are components that are commonly included as a part of the electronic device 105, rather than additional components. However, in some embodiments, the one or more heat generating components 120 may be components that are added to the electronic device 105 (i.e., components that are not traditionally included in the electronic device assembly).

Each of the one or more heat generating components 120 may be any electronic device component that generates heat. Illustrative heat generating components 120 may include, but are not limited to, a diode, a transistor, an integrated circuit, an optoelectronic device, a resistive heater, a vacuum tube, a discharge tube, a power source, a resistor, a capacitor, an inductive device, a transducer, an antenna, an electromechanical device, and/or the like. An optoelectronic device is a semiconductor device that emits, absorbs, detects, or controls electromagnetic radiation. Optoelectronic devices include, but are not limited to, photoelectric or photovoltaic devices such as photodiodes, including solar cells and related devices, phototransistors, photomultipliers or integrated optical circuit elements. Optoelectronic devices also encompass photoconductivity devices such as photo resistors, photoconductive camera tubes or charged-coupled imaging devices. Optoelectronic devices also include stimulated emission devices such as laser diodes or light emitting diodes (LEDs). A resistive heater, which may also be referred to as a Joule heater, is any device that emits thermal radiation when an electrical current is passed therethrough. Nonlimiting examples of resistive heaters include a lay wire heater, a positive temperature coefficient (PTC) heater, carbon strands, carbon sheets, sheets and/or strands that include carbon and/or nickel, or any other type of heating system now known or later developed that emits thermal radiation when energy is applied. An inductive device generally refers to any device that introduces inductance into an electronic circuit, such as, for example, a transformer and an inductor.

It should be understood that in some embodiments, the apparatus 110 and/or the electronic device 105 may be formed such that the one or more heat generating components 120 are formed as an integral component thereof. Thus, as previously described herein, the heat generating components 120 may not be additional components that are added to the electronic device 105, but rather are the components that are typically found in the electronic device 105, but arranged in a particular fashion to achieve the functionality described herein. In other embodiments, the heat generating components 120 may be additional components that are not traditionally included with the electronic device 105, but are added to provide additional functionality, such as the functionality described herein or other additional functionality.

Figure 2:
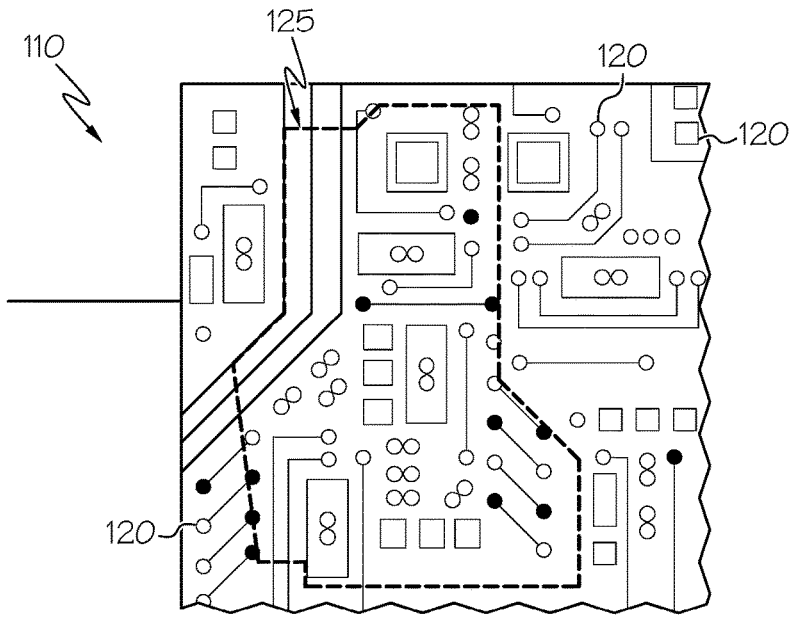
FIG. 2 schematically depicts a detailed view of an arrangement of a portion of the one or more heat generating components of FIG. 1.

FIG. 2 depicts a more detailed view of a portion of the system 100, indicated by the dashed circle in FIG. 1. As shown in FIG. 2, at least a portion 125 of the one or more heat generating components 120 (e.g., the portion 125 indicated by the dashed line) may be particularly arranged such that, when the electronic device 105 is powered on, the addition of electricity to the heat generating components 120 cause the heat generating components 120 to emit thermal radiation that, when imaged by a reading device (as described in greater detail herein), is arranged as a heat pattern.

The heat pattern may generally be comprised of "pixels" that are based on the amount of thermal radiation emitted from the heat generating components 120. That is, a "dark" pixel, as observed by a thermal reading device, may correspond to an area where higher amounts of thermal radiation is emitted (e.g., an area surrounding one of the heat generating components 120 that is actively generating thermal radiation). Similarly, a "light" pixel, as observed by the thermal reading device, may correspond to an area where lower amounts of thermal radiation is emitted (e.g., an area that does not surround one of the heat generating components 120 and/or an area surrounding a heat generating component 120 that is not generating thermal radiation). Since heat is generally detected by thermal reading devices on a scale ranging from cooler temperatures to warmer temperatures, such a scale may be leveraged to produce varying heat patterns based on the temperature of each of the heat generating components 120. Thus, the heat generating components 120 may be selectively controlled (e.g., by one or more processors or controllers) to increase and/or decrease the temperature of the thermal energy released therefrom to particularly configure the heat pattern.

Figure 3A:
FIG. 3A depicts an illustrative symbology in the form of a quick response (QR) code that results from a particular arrangement of one or more heat generating components according to one or more embodiments shown and described herein.
Figure 3B:
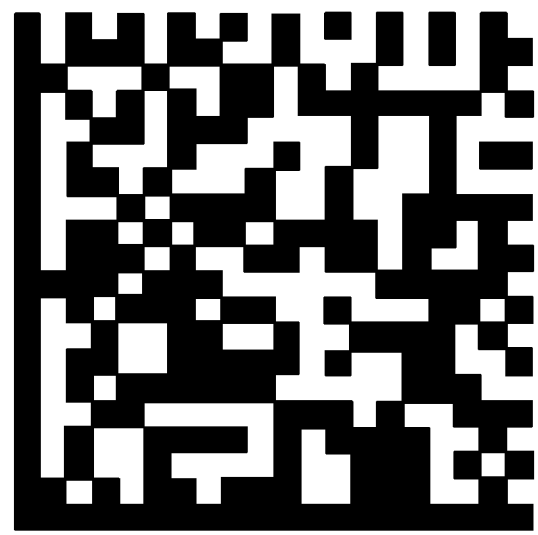
FIG. 3B depicts an illustrative symbology in the form of a data matrix code that results from a particular arrangement of one or more heat generating components according to one or more embodiments shown and described herein.

The heat pattern is not limited by this disclosure, as long as it is distinctly readable and recognizable by a reading device to determine whether the electronic device 105 is authentic or counterfeit. For example, in some embodiments, the heat pattern may be a generally recognized symbology that uses pixels as described herein. In particular embodiments, the heat pattern may be a symbology in the form of a code, such as a 2 dimensional code or a 3 dimensional code. In a nonlimiting example, FIG. 3A depicts a heat pattern that is emitted by the arrangement of heat generating components 120 (FIG. 2) that takes the form of a quick response (QR) code. In another nonlimiting example, FIG. 3B depicts a heat pattern that is emitted by the arrangement of heat generating components 120 (FIG. 2) that takes the form of a data matrix code. In either example, the dark pixels in the code correspond to the thermal energy emitted by one or more of the heat generating components 120 and the light pixels in the code correspond to areas where less thermal energy is emitted. However, it should be understood that the symbologies depicted in FIGS. 3A and 3B are merely illustrative, and any other pattern that can be recognized by a reading device may be used without departing from the scope of the present disclosure.

The location of the particular heat generating components 120 that provide the heat pattern is not limited by this disclosure, and may be at any location on the electronic device 105. Moreover, the location may periodically change. For example, the location may be based on a particular time, may be programmed to change periodically based on a randomly generated key (e.g., a computer-generated key), and/or the like. For example, in some embodiments, all of the heat generating components 120 may emit thermal radiation whenever the electronic device is powered on. However, a particular grouping of heat generating components 120 that are used to determine the heat pattern may change periodically. Alternatively, the electronic device 105 may power on one or more particular groupings of heat generating components 120 at a particular time without affecting the overall function of the electronic device 150. The particular grouping(s) that are powered on may vary from time to time, which may be programmably controlled, randomly generated, or the like, as described in greater detail herein.

Similarly, the orientation of the particular heat generating components 120 that provide the heat pattern is not limited by this disclosure. As such, each of the one or more heat generating components 120 may be oriented with respect to each other and/or the electronic device 105 such that each of the heat generating components 120 emits thermal radiation having a particular shape and/or size when imaged by an imaging device. Such a shape and/or size may be particular for generating the heat pattern. While the physical location of each of the one or more heat generating components 120 will not change, in some embodiments, the shape and/or size of the thermal radiation may be manipulated such that they can change. Such manipulation may be possible, for example, by controlling the amount of thermal energy emitted by each of the heat generating components 120 (e.g., controlling an amount of power supplied to each of the heat generating components 120).

Figure 4:
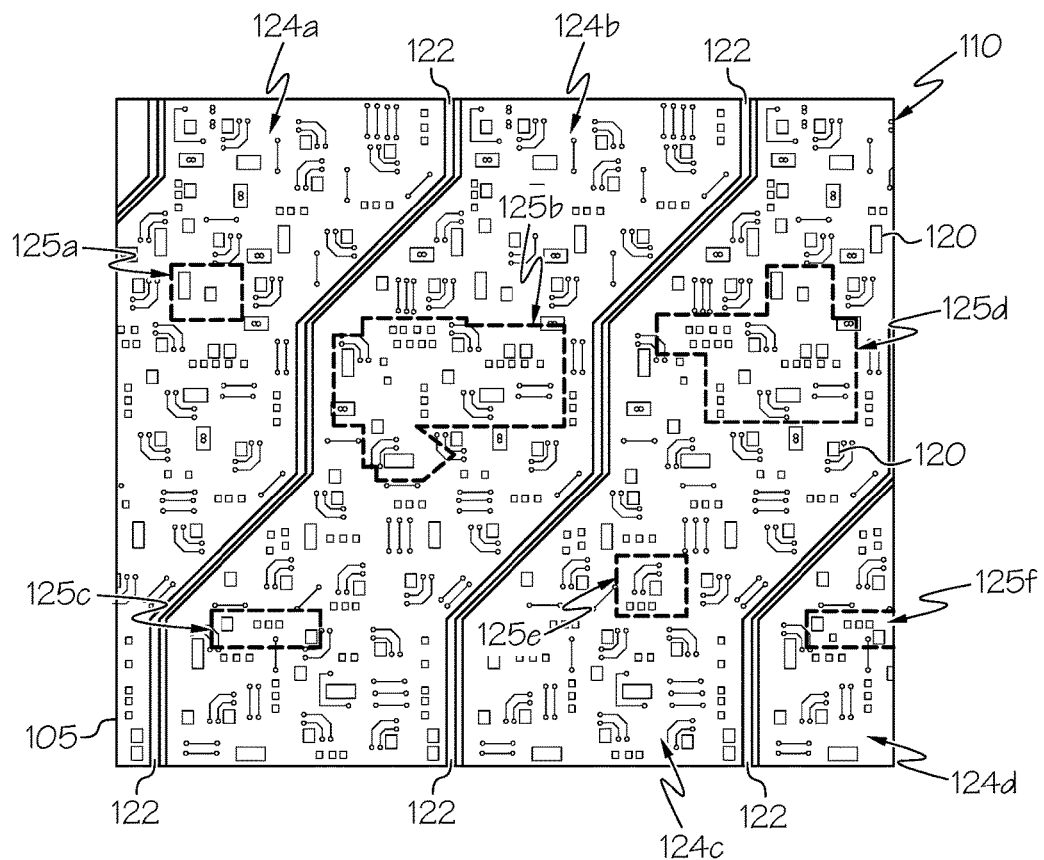
FIG. 4 schematically depicts illustrative locations of one or more heat generating components according to one or more embodiments shown and described herein.

FIG. 4 shows the heat generating components 120 arranged into a plurality of zones 124a-124d. FIG. 4 depicts four zones 124a-124d, but such a number of zones is merely illustrative and any number of zones may be used. The zones 124a-124d may be separated by one or more components of the apparatus 110 and/or the electronic device 105, such as, for example, heat generating components 120 or other components. For example, the dividing components 122 shown in FIG. 4 are conductive traces. Each zone 124a-124d may have one or more portions 125a-125f therein (indicated by the dashed lines). As shown in FIG. 4, a zone 124 may contain a single portion 125 or a plurality of portions 125 therein. In other embodiments, a zone 124 may not include any portions 125 therein. The electronic device 105 may be programmably controlled such that, for purposes of emitting a particular heat pattern, a particular zone from the plurality of zones 124a-124d is first selected, and then a particular portion 125a-125d is selected from that zone. Thus, when the selected portion from the selected zone is imaged by a thermal reading device (as described in greater detail herein), the pattern generated from the selected portion will correspond to an expected pattern, thereby indicating that the electronic device 105 is authentic. Similarly, if a portion other than the selected portion is imaged by a thermal reading device, the pattern generated from that other portion will not correspond to the expected pattern.

Figure 5:
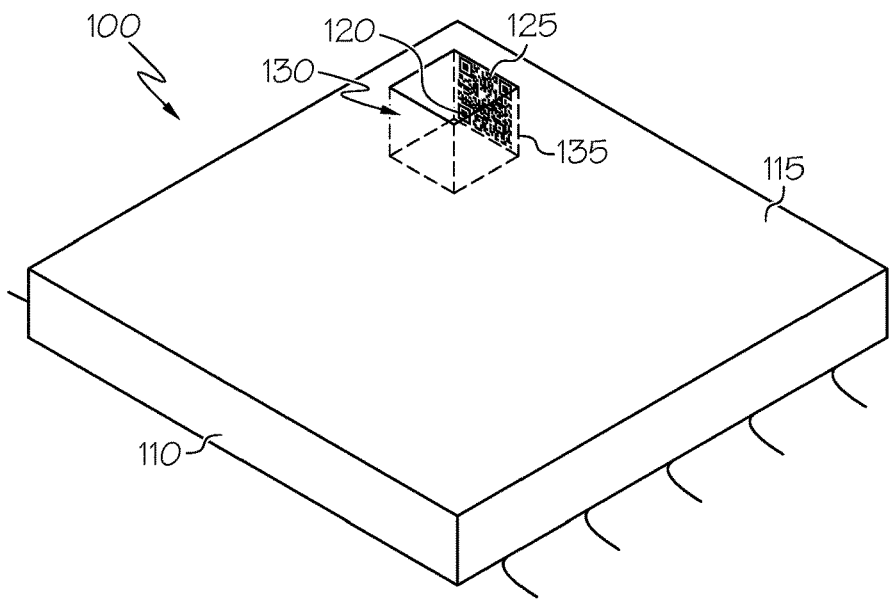
FIG. 5 schematically depicts a side perspective view of an illustrative electronic device having a cavity therein according to one or more embodiments shown and described herein.
Figure 6:
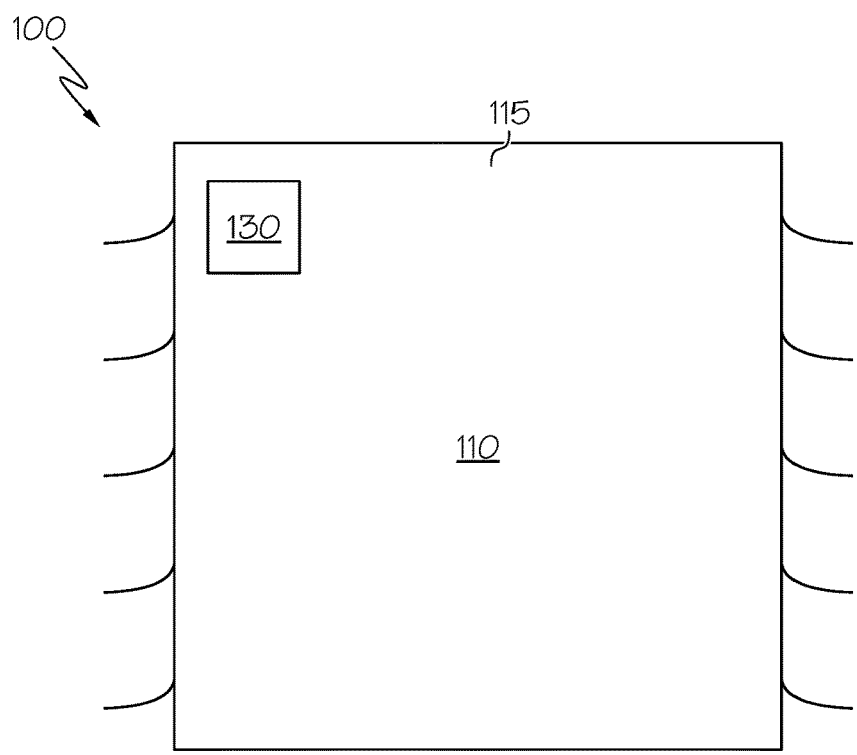
FIG. 6 schematically depicts a top view of the electronic device of FIG. 3.

As shown in FIGS. 1 and 2, in some embodiments, the one or more heat generating components 120 (particularly the portion(s) 125 thereof used to determine an authenticity) may be disposed on a surface of the electronic device 105, such as a top surface 115, a surface within a packaging of the electronic device 105, and/or the like. In other embodiments, as particularly shown in FIGS. 5 and 6, the portion 125 of one or more heat generating components 120 may be disposed on an inner surface of the electronic device 105, such as on an internal wall 135 located within a cavity 130 inside the electronic device 105. The cavity 130 shown in FIGS. 5 and 6 is merely an illustrative cavity. That is, the cavity 130 may be a recess in a package or housing, a passage, a bore through the electronic device 105 (e.g., a via), a channel, and/or the like. In some embodiments, the cavity 130 may be shaped and/or sized to receive a probe tip of a reading device. That is, the cavity 130 may correspond in shape and/or size to a probe tip of a reading device such that the probe tip can be inserted within the cavity 130 to read the pattern of the thermal energy released by the portion 125 of heat generating components 120. In some embodiments, the cavity 130 may be shaped and/or sized such that the heat generating components 120 located therein cannot be seen by the naked eye when observing the system 100. Rather, the heat generating components 120 are only viewable by a reading device when inserted into the cavity 130, as described hereinbelow.

Figure 7:
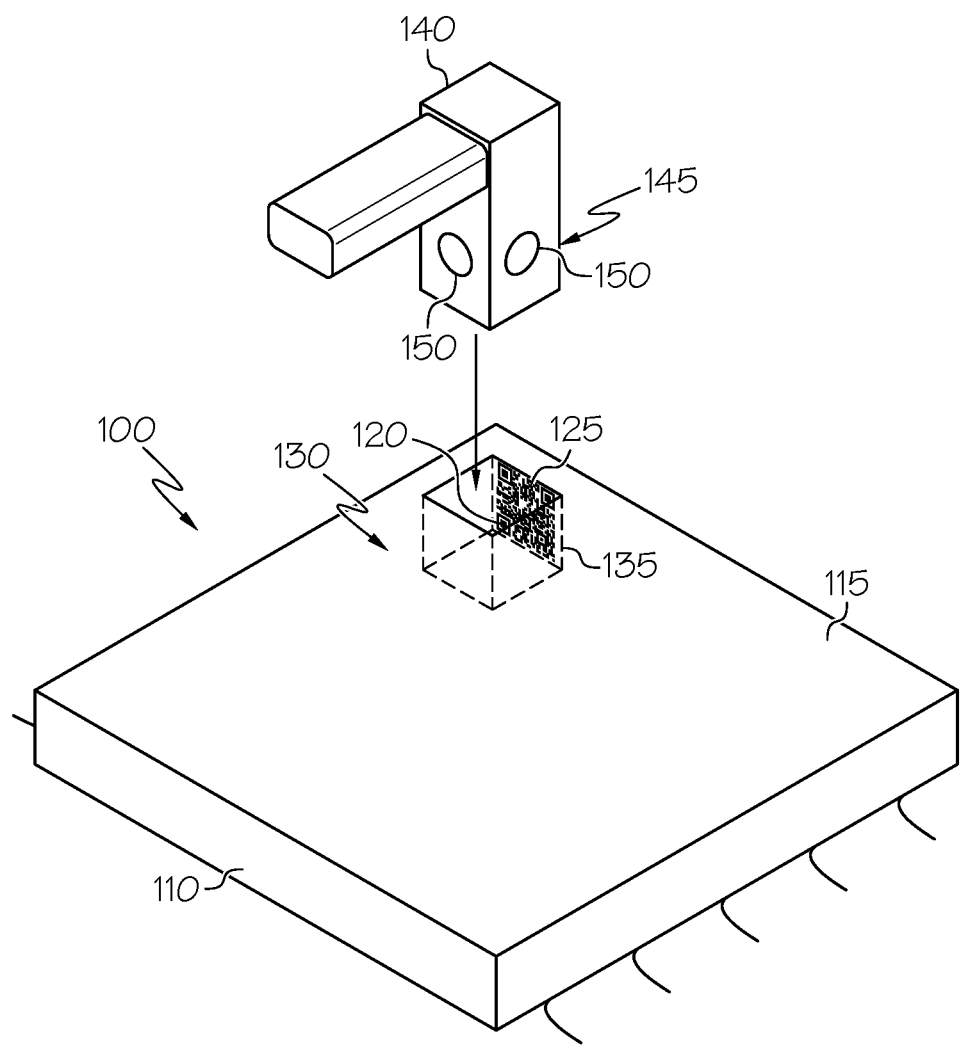
FIG. 7 schematically depicts an illustrative operation of a thermal reading device with an electronic device according to one or more embodiments shown and described herein.

FIG. 7 depicts a nonlimiting example of a reading device 140 according to an embodiment. The reading device 140, which is interchangeably referred to as a thermal reading device herein, is generally any electronic device that is arranged and configured to obtain thermal images. In some embodiments, the reading device 140 may be further configured to determine the heat pattern from the thermal images and further determine whether the electronic device 105 is authentic or counterfeit, based on the heat pattern. In other embodiments, the reading device 140 may merely obtain thermal images and transmit data corresponding to the thermal images to an external computing device (such as a computer, a portable electronic device such as a mobile phone, a tablet, and/or the like). The external computing device (not shown) may then determine the heat pattern from the thermal image data and further determine whether the electronic device 105 is authentic or counterfeit, based on the heat pattern.

In some embodiments, the reading device 140 may have a probe tip 145 that is distally located on the reading device 140. The probe tip 145 may generally be shaped and sized such that it can be inserted within the cavity 130 of the electronic device 105 to read the pattern of thermal energy released by the portion 125 of the heat generating components 120. That is, the probe tip 145 may have a shape and/or a size that corresponds to the shape and/or size of the cavity 130.

One or more thermal imaging devices 150 may be located on the reading device 140. The thermal imaging devices 150 may be thermal sensors, cameras, and/or the like that sense thermal radiation, particularly thermal radiation that is generated by the portion 125 of heat generating components 120. The thermal imaging devices 150 may be capable of obtaining thermal images of the portion 125 of the heat generating components 120 on a micro scale and/or a nano scale while still able to accurately determine the heat pattern. That is, the thermal imaging devices 150 may be able to obtain thermal images of the portion 125 of the heat generating components 120 at a fine resolution when placed adjacent to the heat generating components 120. Thus, the heat pattern generated by the particular arrangement of heat generating components 120 is discernible even when the light and dark pixels thereof are nanometers or micrometers apart from each other.

Figure 8:
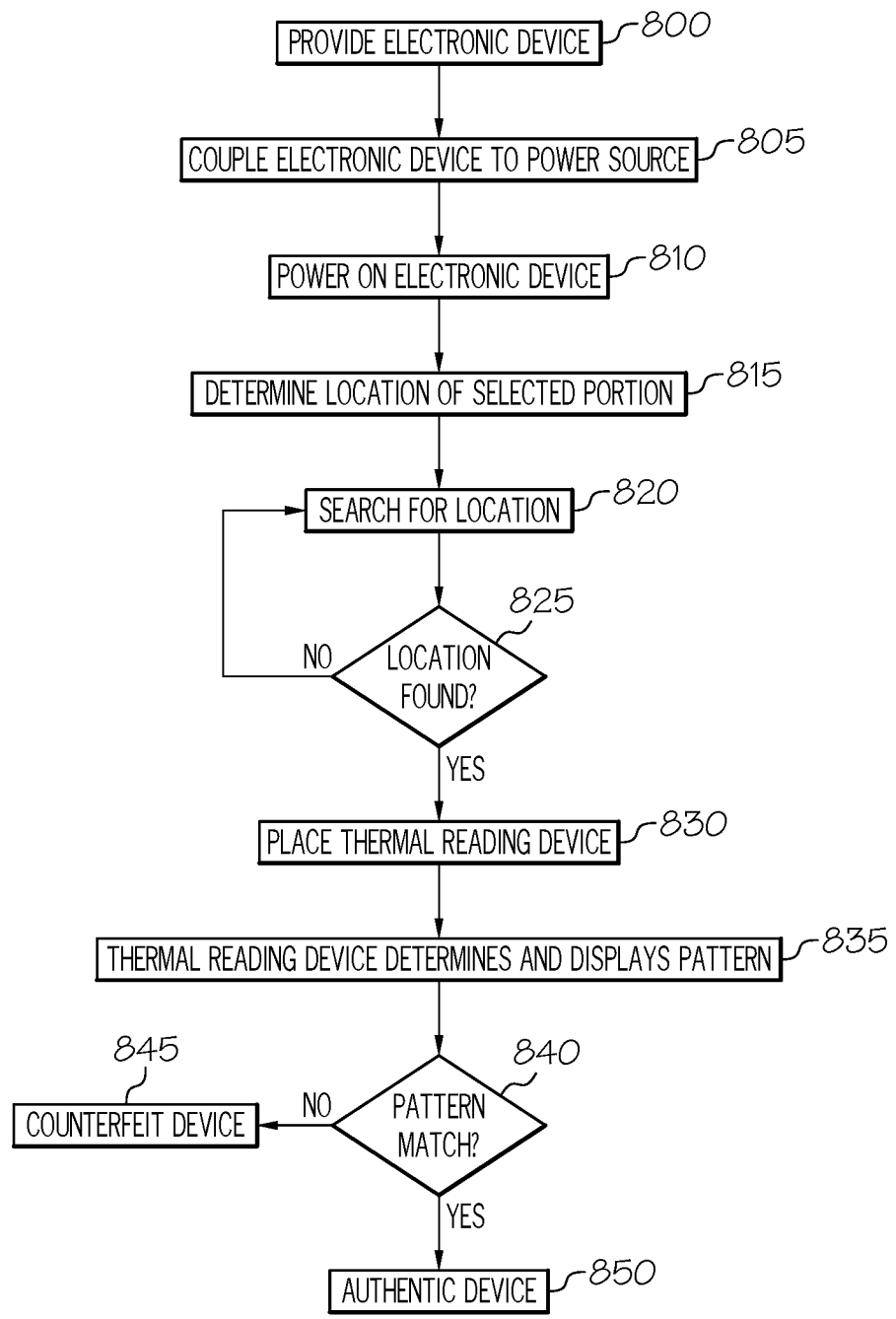
FIG. 8 depicts a flow diagram of an illustrative method of verifying an authenticity of an electronic device according to one or more embodiments shown and described herein.

In operation, the electronic device 105 may be powered on, which in turn causes one or more of the heat generating components 120 to emit thermal radiation in a heat pattern, which can be scanned to determine whether the electronic device 105 is authentic or counterfeit. FIG. 8 is a flowchart that depicts additional details regarding such an illustrative operation.

Referring to FIGS. 7 and 8, in step 800, the electronic device 105 may be provided. The electronic device 105 may be provided as assembled with the apparatus 110 containing the one or more heat generating components 120 or as a component of the apparatus 110, as described in greater detail herein. In some embodiments, providing the electronic device 105 may include constructing or assembling the electronic device 105, the apparatus 110, and/or the system 100, as described in greater detail herein.

In step 805, the electronic device 105 may be coupled to a power source. The power source generally provides electrical power to the electronic device 105 such that it can function, particularly as described herein. The power source may be an external power device or a power device that is integrated with the electronic device 105. For example, the power source may be a battery, a direct current (DC) generator, a solar panel, a fuel-based energy generating device (e.g., hydrogen fuel cell or the like). In some embodiments, the power source may be one or more of the heat generating components 120. It should be understood that step 805 is optional. That is, in embodiments where the electronic device 105 is provided with an integrated power source, step 805 may be omitted.

As shown in step 810, the electronic device 105 may be powered on. Powering on the electronic device 105 may cause at least a portion of the heat generating components 120 to emit thermal energy therefrom, as described in greater detail herein. In some embodiments powering on the electronic device 105 may cause all of the heat generating components 120 to generate thermal energy. In other embodiments, powering on the electronic device 105 may only cause a portion of the heat generating components 120 to generate thermal energy based upon programming, switches, and/or the like that prevent electrical power from reaching other portions of the heat generating components 120, thereby preventing such portions from generating thermal energy.

A location of a selected portion of the one or more heat generating components 120 that are generating the heat pattern is determined in step 815. As described herein, this location may be fixed (i.e., always in the same location, zone, or the like) or may vary. For example, the step of determining the location may include accessing a software application on a computing device that is separate from the electronic device 105, such as, for example, a computing device coupled to or integrated with the reading device 140. The software application may be synchronized with the electronic device 105 such that it provides a location of the currently active heat generating components 120 to be scanned. For example, the software application and the electronic device 105 may each be programmed with a token that generates an authentication code (i.e., a particular portion 125 of the heat generating components 120) at fixed intervals using a clock and an encoded seed key. The encoded seed key and the clock ensure that both the software application and the electronic device 105 each select the same particular portion 125 of the heat generating components 120 at the same time. Thus, when a user accesses the software component to determine the location of the particular portion 125, the software component will be synchronized with the electronic device 105 to accurately provide the location of particular portion 125 at that time. Similarly, if the user accesses the software component at a different time to determine the location of the particular portion 125, the location may have changed and a new location may be provided. While a software application is referred to herein, it should be understood that a hardware device may be used in lieu of a software application without departing from the scope of the present disclosure.

In step 820, the location provided by the software program (or the hardware device) may be searched for on the electronic device. Such a searching step is optional. For example, in embodiments where the location of the one or more heat generating components 120 to be scanned does not change, the location changes in a small confined area that is able to be scanned by the reading device 140 without repositioning, or the location remains the same while the particular heat generating components 120 that emit thermal energy therefrom changes, step 820 may be omitted.

If step 820 is completed and a determination is made that the location has not been found in step 825, the process may return to step 820 to continue searching. Otherwise, the thermal reading device 140 is placed at the location to be scanned in step 830. In step 835, the thermal reading device 140 scans the one or more heat generating components 120 and determines the heat pattern that results from the arrangement and/or particular ones of the heat generating components 120 that emit thermal energy.

A determination is made in step 840 as to whether the heat pattern detected by the heat generating component matches an expected pattern, such as a reference pattern or the like. Such a determination may be made by analyzing the captured image, analyzing a stored image of the expected pattern (e.g., the reference pattern), and determining whether the captured image is an exact match. The analyzing may be completed by the reading device 140, a computing device connected to the reading device 140, or any other device that is capable of completing such an analysis. In embodiments where the analyzing is not completed by the reading device 140, the reading device 140 may transmit image data corresponding to captured images of the heat pattern to the other device for analyzing.

If the imaged pattern does not match the expected pattern, a determination may be made in step 845 that the electronic device 105 is counterfeit or that at least a portion of the electronic device 105 is malfunctioning. If the imaged pattern does match the expected pattern, a determination may be made in step 850 that the electronic device is authentic and/or that the electronic device 105 and the components thereof are properly functioning.

Figure 9:
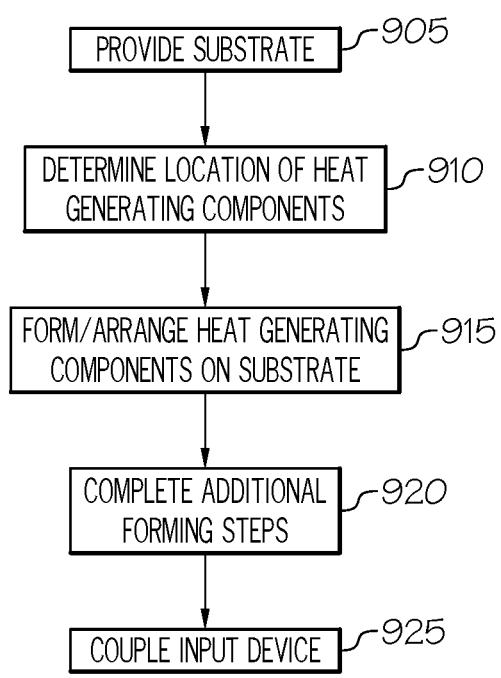
FIG. 9 depicts a flow diagram of an illustrative method of forming a system for verifying an authenticity of an electronic device according to one or more embodiments shown and described herein.

Referring now to FIGS. 7 and 9, a method of forming the electronic device 105 is disclosed. The method generally includes providing a substrate material in step 905. The substrate material may generally be any substrate material that is used for manufacturing electronic devices, particularly the electronic device 105 described herein.

In step 910, a location of the one or more heat generating components 120 with respect to the substrate is determined. In some embodiments, the location may be determined based on instructions that are received from a software program or the like to ensure that the particular portion 125 is accurately located such that it is scanned at a particular time, as described herein. In some embodiments, the location may be determined based on a schematic to ensure that each of the one or more heat generating components 120 is positioned with respect to one or more other heat generating components 120 such that, when the heat generating components emit thermal energy, they emit the thermal energy in the appropriate pattern, as described in greater detail herein. In some embodiments, the location may be determined such that the heat generating components 120 to not hinder the ability of the reading device 140 to image the heat generating components 120. For example, if at least a portion of the heat generating components 120 are located within the cavity 130, such heat generating components 120 may be placed so that they do not block the probe tip 145 from being appropriately inserted in the cavity 130.

Once a location has been determined, the heat generating components 120 may be formed and/or arranged on the substrate according to the determined locations to form the electronic device 105 in step 915. Such forming and/or arranging may be completed via any method of forming an electronic device not known or later developed, and is not limited by this disclosure. Illustrative methods of forming may include, but are not limited to, soldering, chemical deposition, physical deposition (such as thermal evaporating, electron beam evaporating, sputtering, pulsed laser deposition, and/or the like), printing, epitaxy, and/or the like.

In step 920, any additional steps for forming the electronic device 105 may be completed. Such additional forming steps should be generally understood and are not described in greater detail herein.

Optionally, the formed electronic device 105 may be coupled to an input device in step 925. The input device may generally be coupled to the electronic device 105 such that data and/or signals can be transmitted between the electronic device 105 and external components, such as a processing device, memory, an external computing device, and/or the like. Particularly, the input device may allow programming instructions to be sent to the electronic device 105 to direct the electronic device 105 to cause a particular portion 125 of the one or more heat generating components 120 to emit thermal radiation, as described in greater detail herein.

Figure 10:
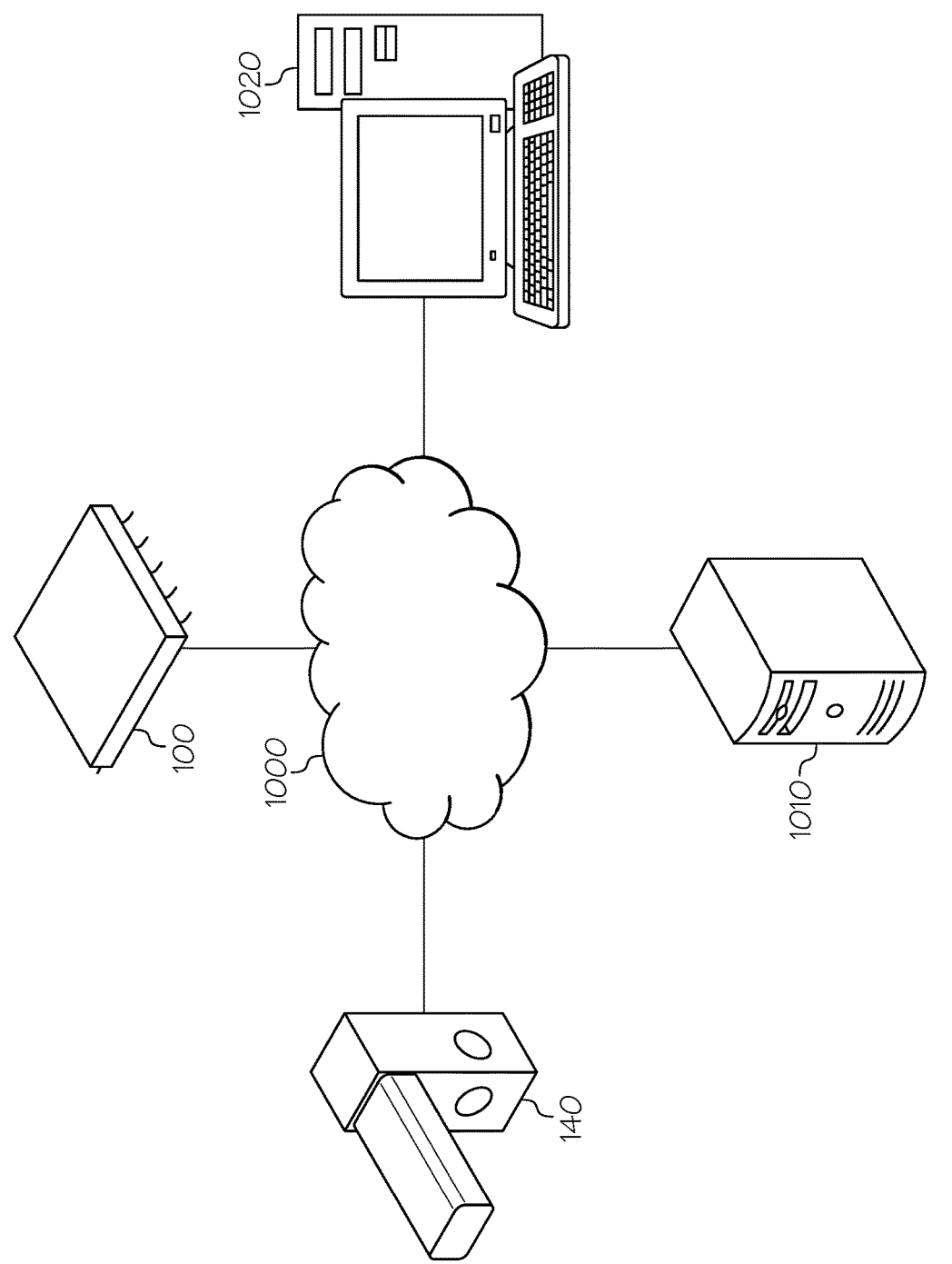
FIG. 10 schematically depicts an illustrative computing network of a system for programming and verifying an authenticity of an electronic device according to one or more embodiments shown and described herein.

FIG. 10 depicts an illustrative computing network that depicts components for a system that provides instructions to the electronic device 105 (FIG. 1) for selectively activating a portion 125 of the one or more heat generating components 120, according to embodiments shown and described herein. As illustrated in FIG. 10, a computer network 1000 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 1000 may generally be configured to electronically connect one or more computing devices and/or components thereof, one or more systems 100 (each containing one or more electronic devices 105 and one or more heat generating components 120, as shown in FIG. 1), and/or one or more reading devices 140. Illustrative computing devices may include, but are not limited to, a user computing device 1020 and a server computing device 1010.

The user computing device 1020 may generally be used as an interface between a user and the other components connected to the computer network 1000. Thus, the user computing device 1020 may be used to perform one or more user-facing functions, such as receiving one or more inputs from a user or providing information to the user. Additionally, in the event that the server computing device 1010 requires oversight, updating, or correction, the user computing device 1020 may be configured to provide the desired oversight, updating, and/or correction. The user computing device 1020 may also be used to input additional data into a data storage portion of the server computing device 1010.

The server computing device 1010 may transmit and/or receive electronic data and/or the like from one or more components (e.g., the system 100 and/or the reading device 140), determine a positioning and/or location of one or more heat generating components that are to be used for determining an authenticity of an electronic device, and/or provide instructions for activating a particular portion of the one or more heat generating components, as described in greater detail herein.

It should be understood that while the user computing device 1020 is depicted as a personal computer and the server computing device 1010 is depicted as a server, these are nonlimiting examples. More specifically, in some embodiments, any type of computing device (e.g., mobile computing device, personal computer, server, etc.) may be used for any of these components. Additionally, while each of these computing devices is illustrated in FIG. 10 as a single piece of hardware, this is also merely an example. More specifically, each of the user computing device 1020 and the server computing device 1010 may represent a plurality of computers, servers, databases, components, and/or the like.

In addition, it should be understood that while the embodiments depicted herein refer to a network of computing devices, the present disclosure is not solely limited to such a network. For example, in some embodiments, the various processes described herein may be completed by a single computing device, such as a non-networked computing device or a networked computing device that does not use the network to complete the various processes described herein.

Illustrative hardware components of the user computing device 1020 and/or the server computing device 1010 are depicted in FIG. 11A. A bus 1101 may interconnect the various components. A processing device 1105, such as a computer processing unit (CPU), may be the central processing unit of the computing device, performing calculations and logic operations required to execute a program. The processing device 1105, alone or in conjunction with one or more of the other elements disclosed in FIG. 11A, is an illustrative processing device, computing device, processor, or combination thereof, as such terms are used within this disclosure. Memory 1110, such as read only memory (ROM) and random access memory (RAM), may constitute illustrative memory devices (i.e., non-transitory processor-readable storage media). Such memory 1110 may include one or more programming instructions thereon that, when executed by the processing device 1105, cause the processing device 1105 to complete various processes, such as the processes described herein. Optionally, the program instructions may be stored on a tangible computer-readable medium such as a compact disc, a digital disk, flash memory, a memory card, a USB drive, an optical disc storage medium, such as a Blu-Ray™ disc, and/or other non-transitory processor-readable storage media.

In some embodiments, the program instructions contained on the memory 1110 may be embodied as a plurality of software modules, where each module provides programming instructions for completing one or more tasks. For example, as shown in FIG. 11B, the memory 1110 may contain operating logic 1112, training logic 1114, and/or verification logic 1116. The operating logic 1112 may include an operating system and/or other software for managing components of a computing device. The training logic 1114 may include one or more software modules for training an electronic device to activate one or more heat generating components for the purposes of determining authenticity, including periodically changing which of the one or more heat generating components are activated, as described in greater detail herein. The verification logic 1116 may include one or more software modules for verifying the authenticity of an electronic device, as described in greater detail herein.

Referring again to FIG. 11A, a storage device 1150, which may generally be a storage medium that is separate from the memory 1110, may contain a data repository for storing data that is used for determining whether an electronic device is authentic, as described herein. The storage device 1150 may be any physical storage medium, including, but not limited to, a hard disk drive (HDD), memory, removable storage, and/or the like. While the storage device 1150 is depicted as a local device, it should be understood that the storage device 1150 may be a remote storage device, such as, for example, a server computing device or the like.

Illustrative data that may be contained within the storage device 1150 may include, for example, image data corresponding to expected patterns emitted by one or more heat generating components (e.g., patterns that can be used to verify the authenticity of the one or more heat generating components), data relating to seed keys for electronic devices that change the expected pattern, and/or the like.

An optional user interface 1120 may permit information from the bus 1101 to be displayed on a display 1125 portion of the computing device in audio, visual, graphic, or alphanumeric format. Moreover, the user interface 1120 may also include one or more inputs 1130 that allow for transmission to and receipt of data from input devices such as a keyboard, a mouse, a joystick, a touch screen, a remote control, a pointing device, a video input device, an audio input device, a haptic feedback device, and/or the like. Such a user interface 1120 may be used, for example, to allow a user to interact with the computing device or any component thereof.

A system interface 1135 may generally provide the computing device with an ability to interface with one or more of the components of the computer network 1000 (FIG. 10), such as, for example, the system 100, a component thereof, and/or the reading device 140. Communication with such components may occur using various communication ports (not shown). An illustrative communication port may be attached to a communications network, such as the Internet, an intranet, a local network, a direct connection, and/or the like.

A communications interface 1145 may generally provide the computing device with an ability to interface with one or more external components, such as, for example, an external computing device, a remote server, and/or the like. Communication with external devices may occur using various communication ports (not shown). An illustrative communication port may be attached to a communications network, such as the Internet, an intranet, a local network, a direct connection, and/or the like.

It should be understood that the components illustrated in FIGS. 11A-11B are merely illustrative and are not intended to limit the scope of this disclosure. More specifically, while the components in FIGS. 11A-11B are illustrated as residing within the server computing device 1010 or the user computing device 1020 (FIG. 10), these are nonlimiting examples. In some embodiments, one or more of the components may reside external to the server computing device 1010 and/or the user computing device 1020. Similarly, one or more of the components may be embodied in other computing devices not specifically described herein.

Figure 12:
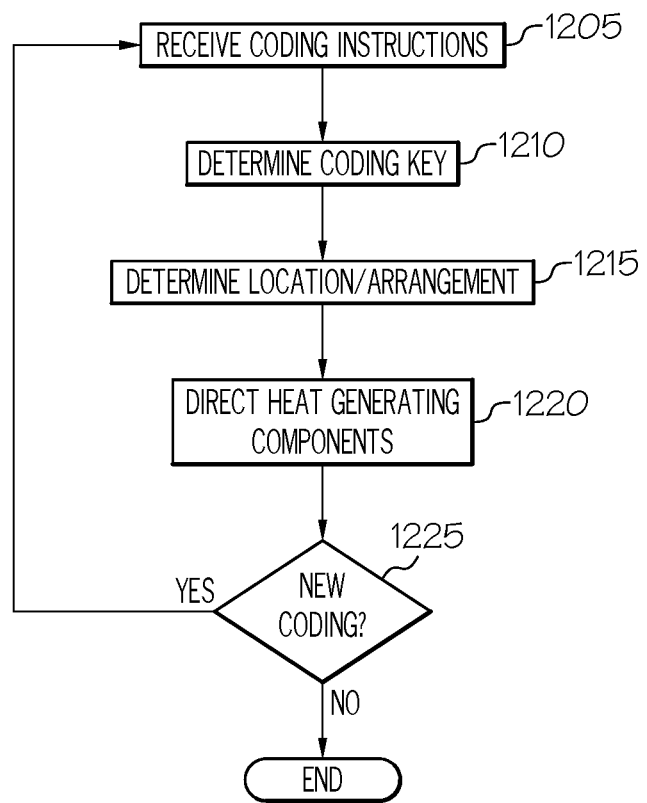
FIG. 12 depicts a flow diagram of an illustrative method of coding a system for verifying an authenticity of an electronic device according to one or more embodiments shown and described herein.

FIG. 12 depicts a flow diagram of an illustrative method used by the computer network 1000 of FIG. 10 (or a component thereof) for coding the system 100 of FIG. 1. The method depicted in the flow diagram of FIG. 12 may be used to initially set up the system 100 to cause a portion of the one or more heat generating components to emit thermal radiation, to recode the system to provide a new location for the one or more heat generating components to generate thermal energy, and/or to provide a seed key, and/or the like.

In step 1205, coding instructions may optionally be received. Receiving coding instructions may generally include receiving a command, such as from an administrator or the like to code, recode, or provide a computer generated key (e.g., a seed key) to one or more systems 100 (FIG. 1). Receiving the coding instructions may be via a user interface, a communications interface, a system interface, or the like, as described with respect to FIG. 11A.

In step 1210, a coding key is determined. The determined key is used for transmission to the system 100 (FIG. 1) for the purposes of designating a portion of one or more heat generating components for generating the thermal energy to produce a heat pattern, as described herein. That is, the key corresponds to the designated portion of the one or more heat generating components. In some embodiments, the key may be a seed key that randomly generates a new portion of one or more heat generating devices for generating the thermal energy to produce a heat pattern at a particular interval. In some embodiments, the key may be a one-time, randomly generated key.

Once the key has been determined, the location and/or arrangement of the one or more heat generating components that correspond to the key may be determined in step 1215. Such a determination may be completed by the system 100 (FIG. 1) or a component thereof, may be completed by a server computing device, and/or may be completed by a user computing device. In embodiments where step 1215 is completed by a server computing device and/or a user computing device, such device(s) may transmit instructions to the system 100 (FIG. 1) or a component thereof.

In step 1220, the heat generating components may be directed based on the determined location and/or arrangement. Such a direction may be completed by the system 100 (FIG. 1), particularly a component thereof such as the electronic device, by ensuring that, when the electronic device is powered on, the appropriate power is delivered to the corresponding heat generating components to ensure they generate thermal radiation, as described in greater detail herein.

In step 1225, a determination may be made as to whether any new coding is needed. New coding may be necessary, for example, to change the location and/or arrangement of the heat generating components in embodiments where a seed key is not used (i.e., where the system 100 cannot automatically change on its own). In some embodiments, new coding might not be needed if the current coding is effective in curbing counterfeit devices. In some embodiments, new coding might be needed to avoid counterfeit goods from copying the existing coding. If new coding is needed, the process may return to step 1205. If no coding is needed, the process may end.

Accordingly, it should now be understood that the apparatuses, systems, and methods described herein may be used to particularly arrange one or more heat generating components of an electronic device in a particular manner such that, when the electronic device is powered on, the heat generating components generate thermal energy that produces a heat pattern that is recognizable by a reading device. The heat pattern can be used to determine whether the electronic device is authentic or counterfeit. In addition, the apparatuses, systems, and methods described herein may also be used to periodically change the heat pattern that is recognized by the reading device by altering which of the one or more heat generating components generate thermal energy. The ability to change the heat pattern without having to physically change the location of the heat generating components provides the apparatuses, systems and methods described herein with an ability to continue to avoid detection by counterfeiters. Also, use of already existing physical components of the electronic device (i.e., the heat generating components) adds to the overall simplicity of the design and does not require special heat generating compounds, inks, or the like, thereby reducing costs associated with such compounds. Moreover, use of such heat generating devices may allow for the detection of malfunctioning devices.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An apparatus comprising:
   one or more heat generating components coupled to an electronic device and arranged in a particular configuration such that, when selectively activated, the one or more heat generating components emit thermal radiation in a specific heat pattern that corresponds to the particular configuration and the selective activation, wherein the specific heat pattern is encoded with information regarding the apparatus such that a code generated by the specific heat pattern is readable by a thermal reading device to obtain the information.

2. The apparatus of claim 1, further comprising the electronic device.

3. The apparatus of claim 2, wherein the electronic device is a semiconductor device, an integrated circuit, one or more electronic circuits, or a system on a chip.

4. The apparatus of claim 1, wherein the one or more heat generating components comprise one or more of a diode, a transistor, an integrated circuit, an optoelectronic device, a resistive heater, a vacuum tube, a discharge tube, a power source, a resistor, a capacitor, an inductive device, a transducer, an antenna, and an electromechanical device.

5. The apparatus of claim 1, wherein the one or more heat generating components are selectively activated when the electronic device is powered on.

6. The apparatus of claim 1, wherein the one or more heat generating components are integrated with the electronic device.

7. The apparatus of claim 1, wherein the one or more heat generating components are disposed on a surface of the electronic device.

8. The apparatus of claim 1, wherein the one or more heat generating components are located within a recess of the electronic device.

9. The apparatus of claim 1, wherein the selective activation selects a portion of the one or more heat generating components to emit the thermal radiation in the heat pattern.

10. The apparatus of claim 9, wherein the selected portion is selected based on a computer-generated key at a particular period of time.

11. The apparatus of claim 1, wherein the heat pattern is a symbology.

12. A method of obtaining information regarding an electronic device, the method comprising:
- activating one or more heat generating components coupled to the electronic device, wherein the one or more heat generating components are arranged in a particular configuration;
- placing a thermal reading device adjacent to the one or more heat generating components, wherein the thermal reading device determines a heat pattern that corresponds to the particular configuration, and wherein the heat pattern is encoded with the information regarding the electronic device; and
- obtaining the information from the heat pattern.

13. The method of claim 12, wherein obtaining the information comprises determining that the electronic device is authentic when the heat pattern matches an expected pattern.

14. The method of claim 12, wherein obtaining the information comprises determining that the electronic device is not authentic when the heat pattern does not match a reference pattern.

15. The method of claim 12, wherein activating the one or more heat generating components comprises powering on the electronic device.

16. The method of claim 12, wherein placing the thermal reading device comprises inserting a probe tip of the thermal reading device within a recess of the electronic device such that the probe tip reads the heat pattern on one or more surfaces of the recess.

17. The method of claim 13, further comprising:
- determining a selected portion of the one or more heat generating components that contains the particular configuration,
- wherein placing the thermal reading device comprises placing the thermal reading device adjacent to the selected portion.

18. The method of claim 17, wherein the expected pattern is based on at least one of the selected portion and a computer-generated key at a particular period of time.

19. A system for verifying an authenticity of an electronic device, the system comprising:
- the electronic device;
- one or more heat generating components coupled to the electronic device and arranged in a particular configuration, the one or more heat generating components configured to activate and emit thermal radiation in a heat pattern that corresponds to the particular configuration when the electronic device is powered on; and
- a thermal reading device,
- wherein the heat pattern is encoded with information regarding the electronic device such that a code generated by the specific heat pattern is readable by the thermal reading device to obtain the information when the thermal reading device is placed adjacent to the one or more heat generating components.

20. The system of claim 19, wherein the one or more heat generating components are located within a recess of the electronic device.

* * * * *